April 24, 1928.
O. HERMANSON
OCEAN STAGE
Filed July 24, 1926
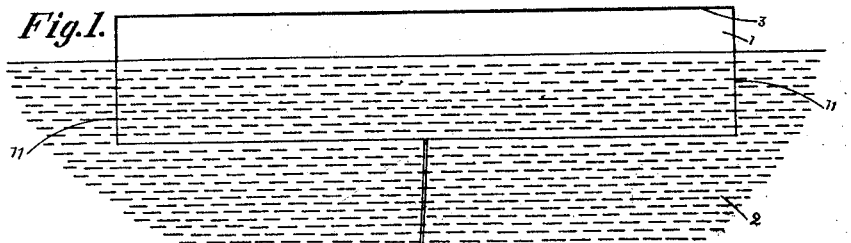
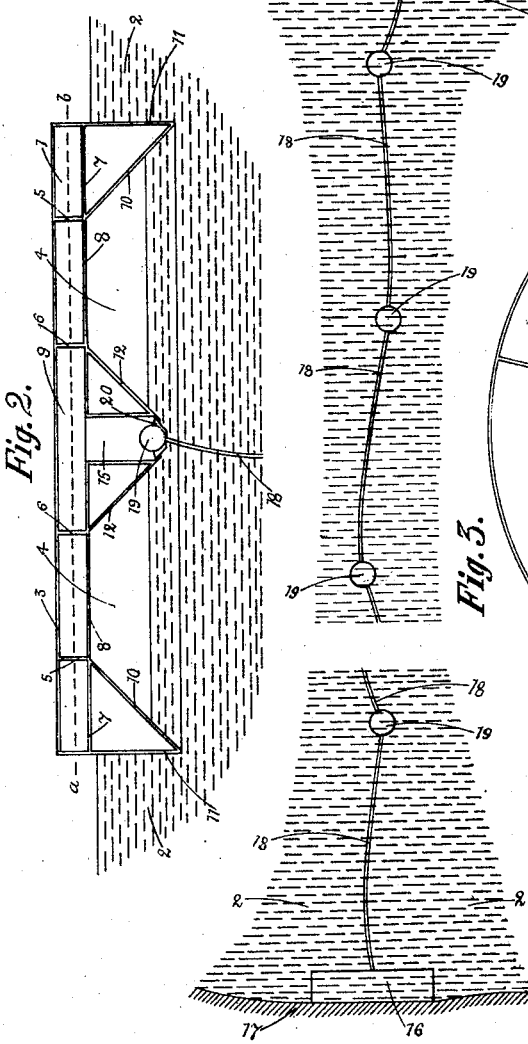
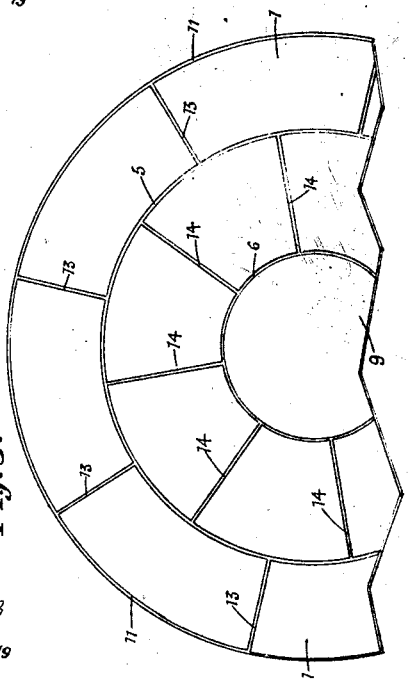
INVENTOR:
Oscar Hermanson.

Patented Apr. 24, 1928.

1,667,255

UNITED STATES PATENT OFFICE.

OSCAR HERMANSON, OF NEW YORK, N. Y.

OCEAN STAGE.

Application filed July 24, 1926. Serial No. 124,665.

Pouring oil on troubled waters has saved many a good ship. Considered by the ancients as a sacrifice to appease the rage of Poseidon, now we know that this expedient is due to the difference in weight, elasticity and viscosity of water and oil which causes waves to run with different velocities in both liquids, so that in their bordering common surface these waves interfere to such an extent with each other that a calm results. That the kinetic energy stored in a rolling ocean is of vast amount when a hurricane lashes the raging waves, cannot be denied, but the localized amount of this kinetic energy is very small because the velocity of the water in the rising crest of a wave is always opposed to the velocity of the water in the adjacent sinking trough, and if by any means you can switch the motion of the crest into the trough, these opposite velocities instantly become compensated and there the wave disappears.

That by means of oil spread on the water a lasting calm could be attained, is out of question because of cost, therefore the object of my present invention is to provide an inexpensive means for calming waves with a lasting effect, and I attain this object by placing on the water what may be described as an inverted tub of generous proportions which, floating on the surface, confines inside a cushion of compressed air that reacts as a buffer on all approaching waves and thus calms the water within a large circle surrounding the floating stage.

In the accompanying drawing Fig. 1 shows the floating stage or safety isle, moored to the bottom of the sea. Fig. 2 is a vertical section through the centre of the stage, and Fig. 3 is a horizontal section at the line a—b in Fig. 2, similar figures referring to similar parts.

In Fig. 1 the floating stage 1 is supposed to be immersed in water 2, presenting on top a circular platform 3 with a diameter of, say 500 feet, as a safe landing field for airplanes. Being open at the bottom and airtight on top and on the sides, which may be, say 100 feet high, and filled underneath with compressed air 4, it is kept afloat by this trapped air which acts as a cushion on every wave or undulating motion and thus secures the immobility of the platform 3 and the tranquility of the surrounding water 2. Of course, I do not confine the construction to any dimensions which readily can be increased if desirable, but which must be generous if the stage shall be of practical use as an airplane station in mid ocean.

With this application in mind its construction is suggested by Fig. 2, which is a vertical section through the centre of the stage 1, and by Fig. 3, which is a horizontal section at the line a—b in Fig. 2. These diagrams show the two concentric cylindrical partitions 5 and 6, which are forming ring shaped compartments, closed at the bottom by floors 7 and 8, and in the centre the circular compartment 9. Below the floor 7 there is the conical support 10 joining the lower rim of the outer cylindrical shell 11, and the cone 12 in the centre. These floors and partitions furnish the structure with a compact and solid frame and being airtight, they will keep the stage afloat if by any accident the compressed air 4 underneath should escape. Of course, many more partitions may be inserted and the compartments may be divided by one or more horizontal floors or decks, this depending on the size of the whole and on the various uses it is to be put to.

In Fig. 3 radial partitions 13 and 14 are shown to subdivide the ring shaped spaces below the upper deck and similar radial vertical partitions may be applied between the conical supporting walls 10 and 12, below the floor 8, which will subdivide the whole space below the floor into a number of compartments, open at the bottom. This is to act against storms and heavy seas which may rock the whole stage and, without such partitions, cause an undulating commotion of the enclosed water in the bottom of the stage, that will be prevented by such partitions.

Reaching from the bottom of the well 15, shown in Fig. 2, to the sinker 16 on the bottom of the sea 17, shown in Fig. 1, is the mooring cable 18. In greater depth of the ocean this cable 18 will have a considerable length and consequently a very heavy weight. In order to cut down its weight I build this cable 18 in sections joined by buoys 19 the buoyancy of which is so calculated that each buoy floats its own weight together with the weight of the section of the cable 18, next below it. In this manner the upper sections have not to carry the weight of the lower sections of the cable 18, which consequently can be built of a uniform strength, merely sufficient to hold the stage to its moorings.

The uppermost buoy 19 is shown in Fig. 2 in the bottom of the well 15, resting on a split socket 20, so that when this buoy is raised, the socket 20 can be removed and the buoy released slipping down the well into the sea. This is a precaution in case of danger, for instance, when an iceberg is bearing down upon the stage. Then the latter in a few minutes can be released from the mooring cable 18 and may be towed out of the path of the iceberg and after this has passed the floating buoy may be picked up and pulled back into the well 15 where the socket 20 will be replaced to hold the cable.

For service in the North Atlantic the stage may be built of steel plate and will not cost more than a ship of moderate size. In tropical waters, however, iron and steel soon succumb to the inroads of vegetable and animal life, therefore in such localities it will be preferable to build the stage of reinforced concrete, which may be done in many different ways, and if a stage originally is built for some single purpose it soon will be found profitable to use it for several other purposes. For instance, if across the Atlantic in a space of, say 3000 miles, four stages are interpolated 600 miles apart, such a distance readily will be covered by an airplane in 5 to 6 hours, and with relays on every stage the Atlantic will be crossed in 24 to 30 hours, and there will be a sufficient demand for fast mail to pay the trip, besides passenger service that will be attractive not only to business men who value their time, but to many by its novelty and also to many who are afraid of sea sickness. Starting from Newfoundland two stages might suffice and the Atlantic be crossed in about 18 hours.

If such a stage line across the Atlantic primarily has been established for aerial navigation only, it will naturally be patronized by sportive motor craft to which it guarantees safe passage, and the several stages, provided with wireless, will become centres for a life saving service, meteorological stations, and foci for all sorts of scientific observations. Submarines can safely approach the calm water around the stage and they may dive outside and rise inside the tank, as a port where they may undergo repairs, or merely may tie up until the crew recuperates. Fishery, so far confined to the shallow waters near coasts, will find the depth of the ocean unlocked around the stages, where fish may be caught in deep dragging nets and may be canned and cured on the spacious premises of the stage.

With a power plant on board the stage for lighting at night and for all sort of work, air pumps will serve in renewing the air under the stage and in maintaining its air pressure. Not the least will be the service of such stages in protecting harbor approaches and canals in time of war carrying heavier guns than can be mounted on battleships, with a steady platform they will prove floating Gibraltars and Heligolands and will hasten final abolition of the folly of naval warfare.

In order still more to increase the tranquilizing effect of the air cushion under the stage and to prevent its absorption by the water below and inside the stage, this may be covered with a film of oil. Of course, this could not be crude petroleum containing volatile fractions that soon will fill the air above with an explosive gas to blow up the whole, but must be heavier oil from which all volatile fractions have been boiled out.

Having described in the foregoing my invention, what I claim as such and desire to secure by Letters Patent, is:

The combination of a maritime structure, comprising a tank with open bottom, with a substantial body of compressed air, filling the tank from top to bottom, so that this body of compressed air and the water underneath can move without obstruction up and down within the tank, in order to serve as a buffer for the purpose of calming the waves around the tank, substantially as described in the foregoing.

OSCAR HERMANSON.